United States Patent [19] [11] 3,910,115
Bonner [45] Oct. 7, 1975

[54] ANGLE TURBINE METER
[75] Inventor: Joseph A. Bonner, Pittsburgh, Pa.
[73] Assignee: Rockwell International Corporation, Pittsburgh, Pa.
[22] Filed: Sept. 21, 1973
[21] Appl. No.: 399,758

[52] U.S. Cl. .............................. 73/231 R
[51] Int. Cl.² ........................... G01F 1/10
[58] Field of Search ............... 73/229, 231

[56] References Cited
UNITED STATES PATENTS
| 1,483,225 | 2/1924 | Hammett | 73/231 |
| 2,615,335 | 10/1952 | Young | 73/231 |
| 2,770,131 | 11/1956 | Sparling | 73/231 |
| 2,842,963 | 7/1958 | Ardley | 73/231 |
| 3,238,776 | 3/1966 | Potter | 73/231 |
| 3,248,943 | 5/1966 | Francisco, Jr. | 73/231 |

Primary Examiner—Herbert Goldstein

[57] ABSTRACT

An angle turbine meter has a T-shaped body comprising opposed coaxial hollow arms intersected at right angles by a hollow leg, one arm having a coupling for connection to an upstream pipe section and the leg having a coupling for connection to an upstream pipe section, and the meter mechanism is inserted through the other arm to be supported therein and to dispose a turbine rotor in the upstream connected arm in the direct path of the inlet fluid flow.

7 Claims, 1 Drawing Figure

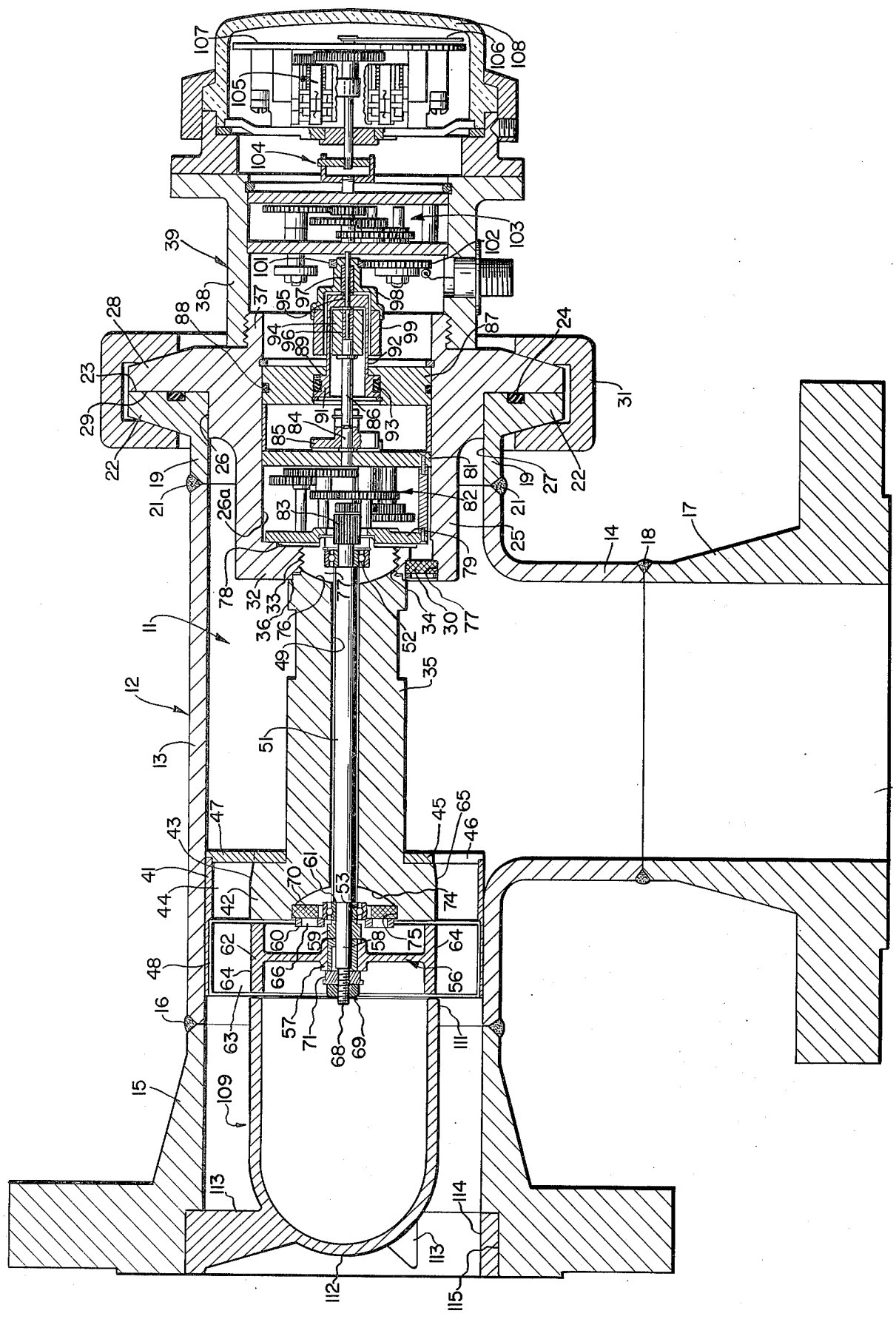

ANGLE TURBINE METER

BACKGROUND OF THE INVENTION

This invention relates to turbine meters of the type wherein a bladed rotor in the path of fluid flow is suitably connected to an external indicator, and particularly to meters of this type that may be installed at a bend or between two angularly related sections of a pipeline.

In its preferred embodiment the invention will be described as a meter adapted for insertion between two sections of pipeline disposed at right angles. The body of the meter may be substantially T-shaped, with one transverse arm and the central leg being formed with pipeline connections so that the meter body constitutes an effective continuation of the pipeline and there is no need for special couplings or joints. The mechanism of the meter is inserted through the other transverse body arm, with the indicator diposed outside the body.

The transverse body arm having the pipeline connection is preferably the inlet side of the meter and the leg is the outlet. The meter mechanism is supported by an internal body member that is removably mounted within the other body arm and has an extensioin locating the rotor in the fluid inlet arm so that the rotor is in the direct path of fluid flow before direction of flow is changed within the meter body.

The meter mechanism itself comprises a driven rotor having peripheral blades disposed in an annular flow region, and suitable gearing and a magnetic drive connecting the rotor shaft to an external indicator. Most of the components of the mechanism are known per se and the invention herein resides in the relative location of parts and special structural arrangements in the assembly. For example, many of the meter components per se to be hereinafter described may be the same as disclosed in the U.S. Pats. to Lee et al No. 3,304,780 and Last et al No. 3,388,595 but these patents disclose turbine meters that are inserted in a straight section of the line. There are also certain detailed structural improvements in the mechanism as will appear It is therefore the major object of this invention to provide a novel turbine meter assembly that is especially constructed and arranged for mounting in a juncture between angularly related pipeline sections.

Another object of the invention is to provide a novel angle turbine meter wherein the meter mechanism is mounted in a substantially T-shaped body that may constitute an effective angular continuation of the pipeline. Further to this object the meter mechanism may be especially supported in the opposite arms of the T with the rotor in the arm connected to receive the incoming fluid.

Further objects will appear as the description proceeds in connection with the appended claims and the annexed drawings.

BRIEF DESCRIPTION OF DRAWINGS

The FIGURE is a side elevation mainly in section showing a meter assembly according to a preferred embodiment of the invention.

PREFERRED EMBODIMENTS

FIG. 1 illustrates a turbine type meter indicated at 11 adapted to be mounted at the juncture of two right angularly disposed pipeline sections. A T-shaped meter body 12 has a straight through hollow tubular section 13 into which opens the hollow tubular boss 14 and which is disposed at a right angle with respect thereto. A flanged inlet line coupling 15 is fixed to one end of body section 13 as by a weld 16, a flanged outlet line coupling 17 is fixed to boss 14 as by a weld 18, and a flanged meter mounting coupling 19 is fixed to the other end of section 13 as by a weld 21. These couplings are in effect integral extensions of body 12.

Thus the welded body assembly is T-shapaed with opposite transverse coaxial arms and an angularly related leg. Coupling 15 is adapted to be connected directly to the flanged end of an upstream section of the pipeline, and coupling 17 is adapted to be connected directly to the flanged end of a downstream section of the pipeline so that the body assembly is an effective continuation of the pipeline. Screw threaded, welded or other couplings could be used in place of the flanged couplings.

The meter mechanism is inserted into the body through the open end of the body arm opposite the fluid inlet arm.

An external annular flange 22 on the meter mounting body arm has a flat end face 23 recessed to receive a resilient O-ring 24.

An annular internal body member 25 which serves to support the meter mechanism has an outer cylindrical surface portion 26 and an inner cylindrical wall 26a and is smoothly slidably mounted in the open end of the body bore 27 adjacent flange 22. An external flange 28 on member 25 has a flat axial face 29 coextensive and tight with body flange face 23. A suitable multipart annular clamp ring 31 is drawn tight around flanges 22 and 28 whereby member 25 is secured rigidly upon the meter body and a fluid tight seal is provided by the compressed O-ring 25.

At its inner end member 25 is formed with an inturned annular flange 32 having a threaded bore 33 in which is mounted the threaded end 34 of a rotor support member 35 that extends coaxially of body section 13. Abutment of shoulder 36 of member 35 with flange 32 determines the axial location of member 35 which becomes in effect a rigid extension of member 25 within the meter body. A filter 30 in the flange 32 permits line fluid pressure to enter internal body member 25.

At its outer end member 25 is formed externally of the body with a short externally threaded boss 37 on which is fixed the drive mechanism housing 38 of a register assembly 39.

Shell 41 is mounted on the englarged inner end 42 of rotor support member 35 by means of radial support plate 45 and is frictionally slidably seated within the inlet body arm. Wall 43 and shell 41 define between them an annular fluid flow passage 44 of desired size. Plate 45 is formed with apertures 46 of substantially the same radial dimension as passage 44 but spaced by two or more narrow radial ribs 47 that do not materially effect fluid flow through the annular passage 44.

Shell 41 extends toward the inlet to form a rotor chamber 48 that is open upstream. Member 35 is formed with a longitudinal through bore 49 that extends from chamber 48 to the interior of member 25. A rotor shaft 51 extends through bore 49 and is freely rotatably supported near opposite ends in ball bearing units 52 and 53 mounted respectively in enlarged axially outwardly open end portions of bore 49. Shaft 51 has free running clearance with bore 49.

A diametrically disposed groove 74 is milled into the end face of enlarged end 42 of rotor support member 35 which groove communicates with both chamber 48 and bore 49 and therefore connects the two. Similarly, diametrically disposed groove 76 is milled into the opposite end face of support member 35 to connect bore 49 and space 78. Opening 77 is formed in flange 32 of member 25 to thereby connect space 78 with the space within boss 14 downstream of the rotor. Thus both sides of each of the bearings 52 and 53 are exposed to the same pressure level so that fluid flow past the bearings is limited to that which might be caused by pulsations in fluid pressure in the line. Accordingly contamination and fouling of the bearings by foreign particles in the fluid is minimized.

A counterbore 75 is also formed in the end face of enlarged end 42 of support member 35 in which is seated a washer-like filter 70.

A rotor 56 is secured on the end of shaft 51 within chamber 48. The rotor hub 57 is mounted on a reduced shaft section 58, and a spacer 59 extends between the hub and the inner race of bearing 53. Nut 69 is threaded onto threaded portion 68 of shaft 51 so that washer 71, hub 57, spacer 59 and the inner race of bearing 53 are clamped between the nut 69 and shoulder 61 on shaft 51. An annular retainer plate 60 is suitably secured in surrounding relation to spacer 59 and serves to clamp the filter element 70 against the end wall of counterbore 75 and abuts against the outer race of bearing 53. Openings 66 permit communication between chamber 48 and groove 74 through filter 70. Thus even when some fluid flow past the bearings 52 and 53 takes place because of pulsations in line pressure the filters 70 and 30 prevent fouling of the bearings by foreign particles in the fluid.

Rotor 56 has an annular rim 62 from which blades 63 project substantially radially into the flow path upstream of passage 44. Rim 62 at the roots of the blades has an external cylindrical surface 64 that has a diameter slightly smaller than the diameter of the adjacent cylindriical surface portion of wall 43 of passage 44.

An imperforate streamlined smooth surfaced nose cone 109 is fixed in the inlet immediately upstream of the rotor. Cone 109 comprises a cylindrical shell 111 the diameter of which is slightly larger than the diameter of rotor rim surface 64. The open end of the cone is disposed closely adjacent the rotor rim 62. The other end of the cone is closed, being substantially spherically rounded as shown at 112, and a plurality of radial struts 113 extend from the closed end of the cone to be fixed to a mounting ring 114 disposed in a recess 115 in the inlet and secured there by any suitable means not shown. As the incoming fluid flows from the exterior surface of the nose cone 109 into the region occupied by blades 63, the slight reduction in diameter of surface 64 from the diameter of surface 109 has the effect of reducing the pressure in the space between the forward edge of the rotor and the adjacent edge of the nose cone. At the same time as the fluid flow passes from the blades 63 into flow passage 44 the slight increase in the diameter of surface 43 over the diameter of cylindrical surface 64 causes a build-up of pressure in the space between the end face of enlarged end 42 and the rotor. The reduction in the pressure in the space between the nose cone and the rotor, and the increase in the pressure in the space between the end face of enlarged end 42 and the rotor has the effect of relieving or minimizing the axial thrust on the rotor which would otherwise be caused by pressure differential across the rotor and the dynamic effects of the fluid impinging on the rotor blades. By minimizing this end thrust the wear on bearings 52 and 53 is reduced and the accuracy of the meter is substantially increased.

Spaced fixed plates 79 and 81 within support member 25 mount a reduction gear assembly indicated at 82. Rotor shaft 51 carries a gear 83 extending to drive gear assembly 82, and the output shaft 84 of the gear assembly extends through plate 81 into a coupling 85 which also receives a magnetic transmission drive shaft 86.

An axially fixed transverse mounting plate 87 extends across the periphery of inner wall 26a of member 25, and has a static O-ring seal 88 at its periphery. Centrally plate 87 is formed with an opening 89 within which is mounted the open end 91 of a cup-shaped casing 92. An O-ring seal 93 extends around the open end of casing 92. Thus plate 87 and casing 92 provide a barrier against line pressure passing therebeyond towards the register.

A magnetic drive coupling element 94 is secured on shaft 86 within casing 92. An arbor 95 is fixed intermediate its ends in the end wall of casing 92. One end of arbor 95 projects within the casing and has bearing engagement indicated at 96 with the end of shaft 86. The outer end of arbor 95 provides bearing support at 97 for a cup-shaped member 98 carrying a magnetic drive coupling element 99. Both of the magnetic coupling elements are permanent magnets.

A gear 101 on member 98 meshes with the input gear 102 of a register drive gear unit indicated at 103, and the output of unit 103 is connected by coupling 104 to drive both the counter 105 and the indicator 106 which moves over dial face 107. A transparent cover 108 extends protectively over the foregoing register parts.

In operation the rotor is driven by the fluid which is guided into the rotor between the nose cone and the interior surface of body section 13 and coupling 15, the rotor shaft, gearing and magnetic drive coupling transmitting rotation of the rotor to the register which is externally accessible.

The entire meter mechanism and register assembly can be inserted into or extracted from the meter body without disturbing its connections with the pipeline, merely by releasing clamp 31 and pulling outwardly on register 39. If desired the register 39 due to its threaded connection at 37 and the axially separable nature of the magnetic drive coupling may be detached without disturbing the sealed closure mounting of internal body member in the body arm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. In a turbine meter, a body having oppositely extending hollow arms and an angularly intersecting hollow leg, means on one of said arms providing for coupling said body to an upstream pipeline section, means on said leg coupling said leg to a downstream pipeline section, and means mounting a meter mechanism in said body comprising an internal body member mounted in the other of said arms, a rotor support rigid with said internal body member and extending into said one arm, said rotor support comprising a coaxial hollow extension of said internal body member having an enlarged end portion within said one arm, said end portion having a fixed outer wall and defining an upstream open rotor chamber and an annular flow passage at the downstream side of said chamber, a rotor shaft extending through and rotatably mounted on said support projecting into said chamber, a rotor on said shaft within said chamber having peripheral blades aligned with said annular flow passage, a register mounted on said internal body member externally of said body, and means drive connecting said rotor shaft to said register.

2. The turbine meter of claim 1 in which the means drive connecting said rotor shaft to said register comprises drive gearing and a magnetic coupling both of which are mounted on said internal body member.

3. In the turbine meter of claim 1 wherein the means drive connecting said rotor shaft to said register includes a magnetic coupling comprising magnetically coupled driving and driven elements, the driving element being rotatably mounted for rotation with said rotor interiorly of the meter body with respect to said internal body member, the driven element being mounted exteriorly of the meter body with respect to said internal body member, both of which elements are mounted for rotation on said internal body member.

4. In a turbine meter, a body having oppositely extending hollow arms and an angularly intersecting hollow leg, means on one of said arms providing for coupling said body to an upstream pipeline section means on said leg coupling said leg to a downstream pipeline section, and means mounting a meter mechanism in said body comprising an internal body member mounted in the other of said arms, a rotor support rigid with said internal body member and extending into said one arm, said rotor support comprising a coaxial hollow extension of said internal body member having an enlarged end portion within said one arm, said end portion defining an upstream open rotor chamber and an annular flow passage at the downstream side of said chamber, a rotor shaft extending through and rotatably mounted on said support projecting into said chamber, a rotor on said shaft within said chamber having peripheral blades aligned with said annular flow passage, a register mounted on said internal body member externally of said body, means drive connecting said rotor shaft to said register, a passage extending substantially the length of said rotor support concentric with the axis of rotation of said shaft and having a diameter larger than said shaft, bearings at either end of said passage for supporting said shaft for rotation in said passage, means for connecting both sides of said bearings to line fluid pressure whereby fluid flow past said bearings is minimized.

5. The turbine meter of claim 4 together with filter means in said connecting means for filtering impurities from the line fluid.

6. In a turbine meter, a body having oppositely extending hollow arms and an angularly intersecting hollow leg, means on one of said arms providing for coupling said body to an upstream pipeline section means on said leg coupling said leg to a downstream pipeline section, and means mounting a water mechanism in said body comprising an internal body member mounted in the other of said arms, a rotor support rigid with said internal body member and extending into said one arm, said rotor support comprising a coaxial hollow extension of said internal body member having an enlarged end portion within said one arm, said end portion defining an upsteam open rotor chamber and an annular flow passage at the downstream side of said chamber, a rotor shaft extending through and rotatably mounted on said support projecting into said chamber, a rotor on said shaft within said chamber having peripheral blades aligned with said annular flow passage, a register mounted on said internal body member externally of said body, a means drive connecting said rotor shaft to said register, said enlarged end portion having an outer cylindrical surface by means of which it is slidably seated within said one arm.

7. The meter of claim 6 in which internal body member has an outer cylindrical surface by means of which said internal body member is slidably seated within said other arm, said cylindrical surface being coaxial with and of substantially the same diameter as the outer cylindrical surface on said enlarged end portion.

* * * * *

UNITED STATES PATENT OFFICE
CERTIFICATE OF CORRECTION

PATENT NO. : 3,910,115
DATED : October 7, 1975
INVENTOR(S) : Joseph A. Bonner

It is certified that error appears in the above-identified patent and that said Letters Patent are hereby corrected as shown below:

Page 1, in the Abstract, Line 6, delete "upstream" and substitute therefor --downstream--.

Column 6, Line 22, delete "water" and insert --meter--.

Signed and Sealed this

Thirteenth Day of July 1976

[SEAL]

Attest:

RUTH C. MASON
Attesting Officer

C. MARSHALL DANN
Commissioner of Patents and Trademarks